United States Patent [19]

Coulson

[11] 4,279,869
[45] Jul. 21, 1981

[54] PROCESS FOR RECOVERING CONCENTRATED, PURIFIED TUNGSTEN VALUES FROM BRINE

[75] Inventor: Norman W. Coulson, Oklahoma City, Okla.

[73] Assignee: Kerr-McGee Corporation, Oklahoma City, Okla.

[21] Appl. No.: 103,031

[22] Filed: Dec. 13, 1979

[51] Int. Cl.³ .............................................. C01G 41/00
[52] U.S. Cl. ................................ 423/54; 75/101 BE; 423/DIG. 14
[58] Field of Search .............. 423/54, DIG. 14, 658.5; 75/101 BE

[56] References Cited

U.S. PATENT DOCUMENTS

| | | |
|---|---|---|
| 3,052,516 | 9/1962 | Drobnick et al. ...................... 423/54 |
| 3,316,058 | 4/1967 | Chaney .................................. 423/54 |
| 3,826,808 | 7/1974 | Nichols et al. ......................... 423/54 |
| 4,092,400 | 5/1978 | Zbranek et al. ........................ 423/54 |
| 4,115,513 | 9/1978 | Kulkarni et al. ....................... 423/54 |
| 4,180,628 | 12/1979 | Marchant et al. ...................... 423/54 |

OTHER PUBLICATIONS

Altringer et al., "Bureau of Mines, RI8315" Dept. of Interior, Wash., D. C. 1978, pp. 1-15.

Primary Examiner—Herbert T. Carter
Attorney, Agent, or Firm—William G. Addison

[57] ABSTRACT

A process for recovering concentrated, purified tungsten values, such as ammonium paratungstate, from a brine containing minor amounts of soluble tungsten and a substantial concentration of impurities, the brine having a pH in the range of from about 7.0 to about 8.5. In general, the process comprises: contacting the brine with a substantially water-insoluble ion exchange resin to adsorb the soluble tungsten; eluting the adsorbed tungsten values from the ion exchange resin; treating the eluate to convert the tungsten values to an extractable species; recovering the extractable species of tungsten values from the eluate to substantially concentrate the tungsten values; contacting the concentrated tungsten values with an extractant to substantially load the extractant with the concentrated tungsten values; and recovering from the extractant a product having concentrated, purified tungsten values.

22 Claims, 1 Drawing Figure

PROCESS FOR RECOVERING CONCENTRATED, PURIFIED TUNGSTEN VALUES FROM BRINE

BACKGROUND OF THE INVENTION

1. Field of the Invention

This invention relates to a process for recovering tungsten values from a brine containing minor amounts of soluble tungsten, and more particularly, but not by way of limitation, to a process for recovering concentrated, purified tungsten values from a brine containing a minor amount of soluble tungsten and a relatively high concentration of impurities.

2. Brief Description of Prior Art

Processes have heretofore been known for producing relatively pure tungsten compounds from beneficated ores. Typical of such processes is the process disclosed in U.S. Pat. No. 4,092,400, issued to Zbranek, et al. This patent discloses a process for recovering tungsten values, in the form of ammonium paratungstate, from tungsten ores and ore concentrates, particularly wolframite ores. The process of the patent incorporates a plurality of steps for the removal of impurities and the formation of the ammonium paratungstate, including grinding, caustic leaching, filtrations, chemical treatment (including acidification for removal of silica impurities), further filtration, solvent extraction of the tungsten values, stripping of the tungsten values from the solvent solution in the form of ammonium paratungstate, and recovering the ammonium paratungstate as a product.

While numerous processes have been proposed for recovering high purity tungsten compositions from ores and ore concentrates, the largest known domestic tungsten deposit is contained in the brine of Searles Lake in California. The brine of the lake, which is utilized in other processing techniques, has been estimated to contain about 170 million pounds of tungsten values in the form of soluble tungsten at concentrations not exceeding about 70 parts per million of the tungstic oxide equivalent. Therefore, the brine of the Searles Lake represents an important source for tungsten if the tungsten can be effectively and efficiently extracted from the brine.

Chemical processes have heretofore been proposed for recovering tungsten from the Searles Lake brine. However, none of the proposed chemical processes have been economical. For example, techniques for chemically treating the brine have failed due to prohibitive operating costs. Further, attempts to precipitate tungstic acid from an acidified brine have not been economically feasible because of the large chemical requirements required to change the characteristics of the alkaline brine.

Other attempts have been made to recover tungsten from the brine of Searles Lake by the use of water-insoluble ion exchange resins, such as work done by the Bureau of Mines of the U.S. Department of the Interior and reported in the Bureau of Mines Report of Investigations/1978, entitled "Tungsten Recovery From Searles Lake Brines." Such resins are capable of selectively adsorbing the tungsten from the brine without modifying the brine with costly complexing agents or other chemicals. However, even with the advent of such ion exchange resins the tungsten values recovered from the brine are impure and the concentration of the tungsten values is relatively low. Thus, a need has long been recognized for a process for recovering concentrated, substantially pure tungsten values, such as ammonium paratungstate, from brine containing a minor amount of soluble tungsten and substantial amounts of impurities.

SUMMARY OF THE INVENTION

Accordingly, the present invention provides a process for recovering concentrated, purified tungsten values from a brine containing minor amounts of soluble tungsten and a substantial amount of impurities. Broadly, the process for the present invention comprises contacting the brine with a water-insoluble ion exchange resin to selectively adsorb the soluble tungsten from the brine; eluting the adsorbed tungsten values from the ion exchange resin; treating the eluate containing the tungsten values to provide an extractable species of the tungsten values; extracting the extractable species of tungsten values from the eluate to substantially concentrate the tungsten values; contacting the concentrated tungsten values with an amine-containing organic solvent system to substantially load the organic solvent with the concentrated tungsten values; and, recovering from the organic phase of the amine-containing organic solvent system a product having concentrated, substantially pure tungsten values.

BRIEF DESCRIPTION OF THE DRAWINGS

A flow diagram, generally indicating the steps in the process of the present invention, is shown in the single FIGURE of the drawings.

DESCRIPTION OF THE PREFERRED EMBODIMENTS

Figure 1:
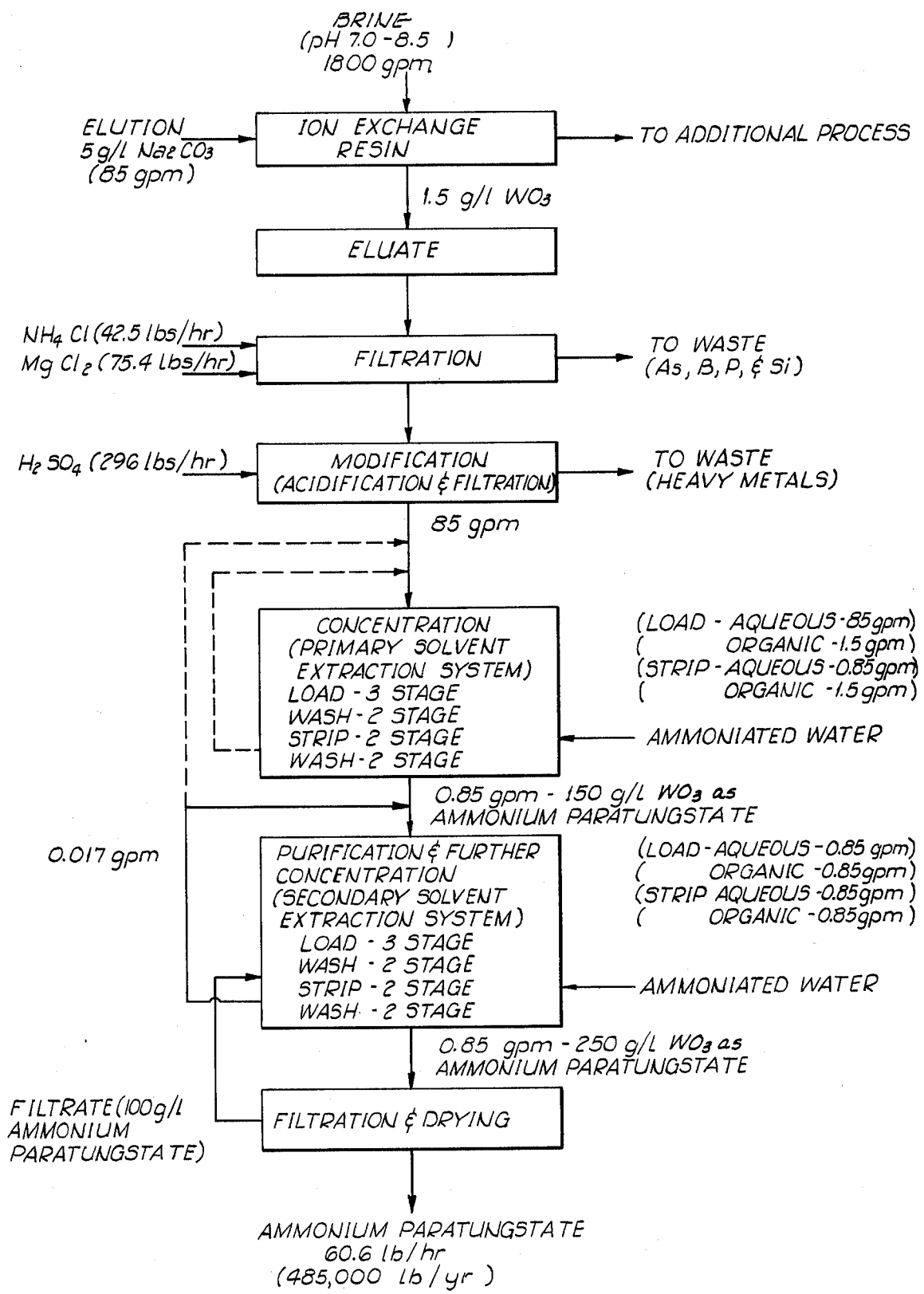

As previously stated, the process of the present invention provides for the recovery of a product having concentrated, purified tungsten values from a brine containing minor amounts of soluble tungsten. Referring to the drawing, which generally depicts the steps of the process of the present invention, the starting material for the process is a brine. A typical example of brine which can be employed in the practice of the present invention is the brine from Searles Lake in California. While the analysis of brine from Searles Lake can vary widely, the brine generally will contain less than about 0.01 weight percent soluble tungsten, calculated as tungstic oxide, and up to about 35 weight percent impurities, such as sodium chloride, sodium sulfate, borax, potassium chloride, sodium carbonate, and minor amounts of silica, manganese, iron, calcium, tin, molybdenum, copper, arsenic, phosphorus and the like. Further, the brine generally will have an alkalinity greater than a pH of about 8.5. In such instances, it is desirable to carbonate the brine to reduce the pH of the brine to a pH level of from about 7 to about 8.5. Any suitable carbonating agent, such as carbon dioxide, can be employed in the carbonation of the brine. Further, the carbonation of the brine can be carried out using standard procedures known in the art.

When the brine is carbonated to lower the pH of the brine to the desired pH level, sodium bicarbonate is formed and precipitates from the carbonated brine. The carbonated brine can be filtered, or otherwise treated, to remove the sodium bicarbonate and other solid materials which may be present. The filtrate, that is the carbonated brine having a pH in the range of from about 7 to about 8.5, then is contacted with a water-insoluble ion exchange resin. The water-insoluble ion exchange resin selectively adsorbs the soluble tungsten from the filtered brine.

The term "brine" as used below is to be understood to include both carbonated and uncarbonated brines having a pH range of from about 7 to about 8.5. Further, the brine will contain a minor amount of soluble tungsten and a substantial amount of impurities.

The term "extracting" as used herein is to be understood to include both liquid and solid means for selectively removing or otherwise separating tungsten values from the eluate.

The term "water-insoluble ion exchange resin" as used herein is to be understood to mean an ion exchange resin capable of selectively adsorbing soluble tungsten from brine, including carbonated brine, without the use of complexing agents or other chemicals. Typical of such water-insoluble ion exchange resins are the phenolic-formaldehyde resins containing polyhydroxide compounds. Such resins can be produced by polymerizing monomers in hot organic solutions, curing the resulting gel, and crushing and screening the block of resin formed from the cured gel. For example, a suitable water-insoluble ion exchange resin for use in the present invention can be prepared by polymerizing 3,4,5-trihydroxybenzoic acid (gallic acid), resorcinol, and formaldehyde. Other suitable ion exchange resins can be prepared by polymerizing 8-hydroxyquinoline, resorcinol and formaldehyde. In addition, polyamines can be employed in the polymerization process when 8-hydroxyquinoline, resorcinol, and formaldehyde are utilized as the monomers. The polymerization techniques employed in the production of the water-insoluble ion exchange resins employed in the process of the present invention are well known to those skilled in the polymerization art and especially to those skilled in the art of polymerizing monomers to produce polymeric compositions useful as ion exchange resins.

The particle size of the water-insoluble ion exchange resins employed in the practice of the present invention can vary widely. However, the particle size of such resins generally will range from about 20 to about 48 mesh, such being the size range employed industrially in most static bed operations. Further, resins having the before mentioned size range generally are fine enough to exhibit desirable loading and elution kinetics and yet large enough to allow the brine to flow through the bed without blinding or building up excessive back pressures.

The loading of the water-insoluble ion exchange resin with the brine can vary widely and generally will be determined by the bed-volume characteristics of the particular water-insoluble ion exchange resin. Typically, the flow rates through the ion exchange bed to assure effective adsorbtion of the soluble tungsten onto the water-insoluble ion exchange resin will be from about 1 to about 5 gallons per minute per square foot of ion exchange bed.

When the water-insoluble ion exchange resin substantially has been loaded with the tungsten values, the flow of the brine through the ion exchange resin is stopped. Thereafter, the adsorbed tungsten values are eluted from the ion exchange resin. Any suitable eluant can be employed to elute the tungsten values from the water-insoluble ion exchange resin. Typical of such eluants are deionized water, and aqueous solutions containing an effective amount, generally from about 0.1 to about 2 weight percent of an eluting agent. Typical of such eluting agents are sodium carbonate, potassium carbonate and ammonium hydroxide, as well as sodium bicarbonate, sodium chloride, sodium sulfate, sodium hydroxide, and the like. The most efficient and effective eluants are believed to be an aqueous solutions containing about 0.5 weight percent sodium carbonate or 0.5 weight percent ammonium hydroxide. However, when employing an aqueous solution of ammonium hydroxide as the eluant, care must be exercised to insure that the pH of the eluant is not sufficiently high to degrade the water-insoluble ion exchange resin.

The eluate, an aqueous solution containing the tungsten values, thereafter can be treated to insure that the tungsten values contained in the eluate are converted to an extractable species. The particular eluate treating technique employed to insure that the tungsten values are in the form of an extractable species will be dependent upon the technique employed in recovering the tungsten values from the eluate. For example, if the tungsten values are to be recovered from the aqueous eluate by solvent extraction techniques, the eluate is acidified to a pH in the range of from about 1 to about 2. While the extract mechanism resulting from the acidification of the aqueous eluate is not known, it is believed that a series of complex polytungstate ions are formed at the pH set forth. As an example, the polytungstates may be formed in accordance with the following equation:

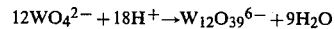
$$12WO_4^{2-} + 18H^+ \rightarrow W_{12}O_{39}^{6-} + 9H_2O$$

On the other hand, one may contact the aqueous eluate with an effective amount of a chemical reagent, such as hydrogen sulfide, to convert the tungsten values to thiotungstate and thereafter recover the thiotungstate from the eluate by any suitable method known in the art. Another alternative is that one may desire to extract the tungsten values from the eluate using a water-insoluble ion exchange resin selective to the tungsten values. In such instance, the aqueous eluate containing the tungsten values is acidified to a pH in the range of from about 1 to 2 by the controlled addition of any suitable mineral acid, such as hydrochloric acid, sulfuric acid and the like. Thereafter, the acidified eluate containing the complex polytungstate ions (as hereinbefore set forth) is contacted with the water-insoluble ion exchange resin in accordance with the procedures set forth before.

While any suitable technique can be employed for recovering the tungsten values from the eluate, the most desirable and effective method for recovering and concentrating the tungsten values from the eluate is believed to be via a solvent extraction system. Thereafter, the concentrated tungsten values recovered from the solvent extraction system are subjected to a second solvent extraction system for purification and further concentration so that a concentrated, purified product can be obtained.

Prior to treating the tungsten rich eluate to insure that the tungsten values are in the form of an extractable species, it may be desirable to contact the tungsten rich eluate with an inorganic metal salt or mixture of inorganic metal salts, such as ammonium chloride and magnesium chloride, to precipitate any arsenic, boron, phosphorus and silica present as impurities in the eluate. Such can be accomplished by admixing at least a stoichiometric amount of ammonium chloride and magnesium chloride (based on the amount of such impurities in the eluate) with the eluate filtering the resulting solution, and treating the filtrate to convert the tungsten values to an extractable species.

As previously stated, the most desirable and effective method for concentrating and purifying the tungsten values in the aqueous eluate is believed to be with a solvent extraction system. Prior to subjecting the aqueous eluate to the solvent extraction system, the aqueous eluate is acidified to a pH of from about 1 to about 2. The pH reduction of the aqueous eluate is accomplished by the addition of an effective amount of a mineral acid, such as sulfuric acid, hydrochloric acid and the like. The addition of the mineral acid is controlled by diluting the acid with water. The concentration of tungsten values, at this point of the process is generally from about 1 to about 5 grams per liter. The adjustment of the pH of the aqueous eluate by acidification is important if the solvent extraction system is to be effective in concentrating the tungsten values. For example, if the pH of the acidified eluate is less than about 1, tungstic acid tends to precipitate thereby rendering the solvent extraction system ineffective for concentrating the tungsten values. On the other hand, if the pH of the acidified eluate is above about 2, the raffinate from solvent extraction system will have a high tungsten content which results in a substantial loss of tungsten. Further, if the pH of the acidified eluate is above about 2, phase separation problems may occur and emulsion problems may be encountered.

The acidified eluate may contain additional inorganic precipitates. Therefore, the acidified eluate may be filtered to remove such precipitates and the clarified liquor (containing the tungsten values in the form of complexed polytungstates) is treated to recover concentrated tungsten values. The treatment of the clarified liquor to recover the concentrated tungsten values can be by any suitable means, such as by feeding the clarified liquor to the solvent extraction system as indicated above. The solvent extraction system not only recovers the tungsten values but also concentrates the tungsten values. The clarified liquor, that is the filtrate, is countercurrently contacted with an amine-containing organic solvent so that the tungsten values are extracted into the solvent phase.

Any suitable amine can be employed for use in the solvent extraction system for concentrating the tungsten values. Such amines may be aliphatic in nature or partially aromatic. In general, the amines may be either secondary or tertiary amines containing aliphatic hydrocarbon groups of from about 8 to 22 carbon atoms. The non-aromatic carbon constituent of the amine can be saturated, unsaturated, straight chain, highly branched or any combination thereof, provided the amines are capable of extracting and concentrating the tungstic oxide from the acidified solution. Typical of such amines is a tertiary organic amine having a mixture of carbon chains containing from about 8 to about 10 carbon atoms. Such an amine is sold commercially as Alamine 336 by General Mills Chemical, Inc. and as Adogen 364 by Ashland Chemical Company.

The amines, as indicated above, are diluted in organic solvents. The most commonly employed solvent is kerosene. However, the diluent can be any aromatic or aliphatic solvent which does not interfere with the reactants under the condition of the reaction. For example, the diluent can be benzene, zylene, petroleum ether and the like. Further, it may be desirable to incorporate into the organic diluent an effective minor amount of a ketone, organic phosphorus compound or an alcohol. If an alcohol is employed it is believed that the chain length of the alcohol should generally be in the range of from about 6 to about 10 carbons per molecule. The ratio of the amine and diluent can vary widely. However, generally the ratio of amine and diluent will be in the range of from about 2.5 to 12 parts of kerosene, by volume, for each part by volume of the amine employed. Further, if an alcohol is incorporated into the diluent, the amount of alcohol generally will range from about 1 to about 1.5 parts, by volume, per part by volume of the amine.

When employing the amine-containing organic solvent described above (in combination with the pH of the acidified eluate), the organic phase of the solvent is loaded with from about 100 to about 200 grams per liter of the tungsten values. It is believed that these higher loadings, which results in the concentration of the tungsten values in the organic phase of the solvent, are due to the formation of the complex polytungstates having increased weight to charge ratios at the pH set forth.

When a solvent extraction system is employed to concentrate the tungsten values, the solvent extraction system desirably will comprise a sequence of processing circuits such as a three stage loading circuit, a two stage washing circuit, and a two stage stripping circuit. The temperature in the three stage loading circuit of the solvent extraction system for concentrating the tungsten values would generally be from about 30° C. to about 60° C. The pH should be maintained by continuing acid addition, if necessary, in the range of from about 1 to about 2, and the ratio of organic to aqueous materials in each loading stage should be about 1:57. The three loading stages are connected in series and the acidified eluate is countercurrently directed through each of the loading stages.

Following extraction of the tungsten values via the above described loading states, the pregnant organic solvent is washed with water in the two stage wash circuit to remove entrained impurities, primarily sodium sulfate suspended in the organic phase. Following the wash cycle, the tungstic values are stripped from the organic solvent in the two stage stripping circuit by adding ammoniated water to the washed organic solvent. The concentration of ammonia in the ammoniated water can vary depending upon the concentration of the tungstic values in the organic solvent at any given pH. Generally, however, the concentration of ammonia in the ammoniated water is from about 1 to about 5 weight percent ammonia. The temperature at which the stripping of the tungsten values from the organic solvent is carried out can vary widely, but, generally will be within the range of from about 40° C. to 50° C. The elevated temperature accelerates phase disengagement and increases the concentration of ammonium paratungstate (formed by the addition of the ammoniated water) that can be achieved in the aqueous strip solution.

The mixing time in the stripping circuit can also vary widely. During the initial stripping of the tungsten values from the organic solvent, the ammonium paratungstate formed by the addition of the ammoniated water may begin to precipitate. In such instance, mixing should continue until the ammonium paratungstate solids have redissolved in the aqueous phase. During the stripping step of the solvent extraction system and to insure that the ammonium paratungstate is substantially redissolved in the aqueous media, the pH of the solvent system is maintained in a range of from about 7.5 to about 8.5. If a pH of less than 7.5 is employed, the stripping will be incomplete. On the other hand, if the pH is above 8.5, only limited redissolution of the ammonium paratungstate will occur.

The ratio of the ammoniated aqueous and organic phase of the stripping operation can vary widely, but, is generally about 1:6. The organic phase recovered from the stripping operation can be recycled. However, the ammonia must be removed from the organic phase before recycling. Such can readily be accomplished by washing the organic phase, after stripping, with deionized and/or acidified water in a two stage wash circuit. The ratio of the aqueous phase to the organic phase in the recycle stream is maintained at about 1:1.

The ammonium paratungstate (which is now in the aqueous phase) is concentrated and the aqueous solution contains from about 100 to about 200 grams per liter ammonium paratungstate. The concentrated ammonium paratungstate then is subjected to purification and further concentration by subjecting the aqueous solution containing the ammonium paratungstate to a second solvent extraction system.

The solvent extraction system employed to purify and further concentrate the ammonium paratungstate generally will comprise a sequence of processing circuits, such as a three stage loading circuit, a two stage wash circuit and a two stage stripping circuit. For efficient operation each stage of the three stage loading circuit should be maintained at a temperature generally within the range of from about 30° C. to about 60° C. Further, the pH of the feed stream (that is, the aqueous phase containing the concentrated ammonium paratungstate) should be adjusted to a pH in the range of from about 1 to about 2 by the addition of a mineral acid, such as sulfuric acid, hydrochloric acid and the like. The ratio of organic to aqueous material in each stage of the three stage loading circuit desirably will be in the range of about 1:1. The three loading stages of the loading circuit are connected in series and the acidified aqueous feed stream containing the concentrated ammonium paratungstate is countercurrently directed through each of the three loading stages.

Following extraction of the tungsten values via the above described three stage loading circuit, the pregnant organic solvent is washed with water in the two stage wash circuit to remove entrained impurities, such as sodium sulfate, which may be suspended in the organic phase. Following the wash cycle, the tungstic values are stripped from the organic solvent in a two stage stripping circuit by adding ammoniated water to the washed organic solvent. The concentration of ammonia in the ammoniated water can vary depending upon the concentration of the tungsten values in the organic solvent and the pH of the organic solvent. Generally, however, the concentration of ammonia in the ammoniated water is from about 1 to about 5 weight percent ammonia. The temperature at which the stripping of the tungstic values from the organic solvent is carried out can vary widely, but generally will be within the range of from about 40° C. to about 50° C. The elevated temperature accelerates phase disengagement and increases the concentration and purification of the ammonia paratungstate formed by the addition of the ammoniated water that can be achieved in the aqueous strip solution.

The mixing time in the stripping circuit also can vary widely. During the initial stripping of the tungsten values from the organic solvent, the ammonia paratungstate formed by the addition of the ammoniated water may begin to precipitate. In such instances, mixing should continue until the ammonium paratungstate solids have redissolved in the aqueous phase. During the stripping of the ammonium paratungstate from the organic solvent and to insure that the ammonium paratungstate is redissolved in the aqueous media, the pH of the solvent system is maintained in a range of from about 7.5 to about 8.5. If a pH of less than 7.5 is employed, the stripping will be incomplete. On the other hand, if the pH is above 8.5, only limited redissolution of the ammonium paratungstate will occur.

The ratio of the ammoniated aqueous phase and the organic phase of the stripping operation is generally about 1:1. The organic solvent recovered from the stripping circuit can be recycled. However, the ammonia must be removed from the organic solvent before recycling. Such can be accomplished by washing the organic solvent, after stripping, with deionized and/or acidified water in a two-stage wash circuit. The washed organic solvent, substantially free of ammonia, then can be recycled for subsequent use in either the initial solvent extraction system employed to concentrate the tungsten values or the secondary solvent extraction system employed to purify and further concentrate the tungsten values. Further, the recycle of the organic solvent can be directed to both of the two solvent extraction systems.

The ammonium paratungstate is now present in the ammoniated aqueous strip solution in an amount of from about 200 to about 300 grams per liter. Further, the ammonium paratungstate is substantially free of the impurities originally present in the brine.

The concentrated, purified ammonium paratungstate can be recovered from the ammoniated aqueous strip solution by any technique known in the art, such as evaporative crystallization, cooling the hot strip solution to allow the ammonium paratungstate to crystallize and the like. The crystallized ammonium paratungstate then can be recovered by filtration.

The filtrate of the filtration can be recycled to the two stage strip circuit of the secondary solvent extraction system where, after pH adjustment, the filtrate is reloaded with ammonium paratungstate at a temperature of from about 45° C. to about 55° C. This procedure eliminates the need for additional evaporation stages and thus results in a substantial savings in equipment costs.

The ammonium paratungstate product recovered from the filtration of the strip solution can be dried using any suitable technique known in the art. Further, the ammonium paratungstate will be substantially free of impurities originally present in the brine, namely arsenic, boron, phosphorus, silica and other heavy metals.

The above described process provides an efficient and effective method for recovering concentrated, purified tungsten values (such as ammonium paratungstate) from a brine containing minor amounts of tungsten values (in the form of tungstic oxide) and substantial amounts of impurities without the use of substantial chemical costs, processing costs, or equipment modifications to obtain the desired result. Further, while the subject invention has been described in terms of certain preferred embodiments, and illustrated by a drawing, such are intended for illustrative purposes only and alternatives or equivalents may readily occur to those skilled in the art without departing from the spirit and scope of the invention as set forth in the appended claims.

What is claimed is:

1. A process for recovering concentrated, purified tungsten values from a brine, the brine containing a minor amount of soluble tungsten and a substantial amount of impurities, the process comprising:
   (a) contacting the brine with a water-insoluble ion exchange resin to adsorb the tungsten;
   (b) eluting the adsorbed tungsten from the water-insoluble ion exchange resin with an effective amount of an aqueous eluant to provide an aqueous eluate rich in tungsten values;
   (c) treating the aqueous eluate rich in tungsten values to convert the tungsten values to an extractable species of tungsten values;
   (d) recovering the extractable species of tungsten values from the aqueous eluate to substantially concentrate the tungsten values;
   (e) contacting the concentrated tungsten values with an extractant preferential to the tungsten values to substantially load the extractant with the concentrated tungsten values and to exclude impurities from the extractant; and
   (f) stripping the tungsten values from the extractant to provide a product having concentrated, purified tungsten values.

2. The process of claim 1 wherein the extractant comprises an effective amount of an amine-containing organic solvent.

3. The process of claim 1 wherein the step of treating the aqueous eluant rich in tungsten values to convert the tungsten values to an extractable species comprises:
   acidifying the aqueous eluate with an effective amount of a mineral acid to adjust the pH of the aqueous eluate to a pH in the range of from about 1 to about 2.

4. The process of claim 3 which further comprises filtering the acidified aqueous eluate to remove solid materials therefrom.

5. The process of claim 3 wherein the mineral acid is sulfuric acid.

6. The process of claim 3 wherein the brine has a pH in the range of from about 7 to about 8.5.

7. The process of claim 3 which further comprises:
   carbonating the brine with an effective amount of a carbonating agent to provide a carbonated brine having a pH in the range of from about 7 to about 8.5.

8. The process of claim 7 wherein the carbonating agent is carbon dioxide and wherein the process further comprises:
   filtering the carbonated brine to remove solid materials from the carbonated brine.

9. The process of claim 3 wherein the step of extracting the extractable species of the tungsten values from the aqueous eluate comprises:
   contacting the acidified aqueous eluate with an effective amount of an amine-containing organic solvent to substantially load the organic solvent with the tungsten values;
   washing the organic solvent containing the tungsten values with an aqueous solution; and
   stripping the tungsten values from the organic solvent by admixing an effective amount of an aqueous stripping agent with the organic solvent to provide an aqueous solution containing concentrated tungsten values.

10. The process of claim 9 wherein the aqueous stripping agent is ammoniated water and the ammonia is present in an amount of from about 1 to about 5 weight percent.

11. The process of claim 9 which further comprises:
    washing the organic solvent containing the concentrated tungsten values with an aqueous solution prior to stripping the tungsten values from the organic solvent.

12. The process of claim 11 wherein the stripping of the concentrated tungsten values from the organic solvent comprises:
    admixing an effective amount of an ammoniated aqueous solution with the organic solvent to provide an aqueous phase containing the concentrated tungsten values and an organic solvent phase; and
    separating the aqueous phase from the organic solvent phase.

13. The process of claim 12 wherein the aqueous phase of the stripping step is maintained at a pH of from about 7.5 to about 8.5 and the admixing of the ammoniated aqueous solution with the organic phase is for a period of time effective to allow solid tungsten values formed by the addition of the ammoniated aqueous solution to redissolve in the aqueous phase.

14. The process of claim 13 wherein the concentrated purified tungsten values in the aqueous solution resulting from the stripping step are ammonium paratungstate, and the ammonium paratungstate is recovered from the aqueous solution by cooling the aqueous solution containing the concentrated, purified ammonium paratungstate to crystallize the ammonium paratungstate, separating the crystallized ammonium paratungstate from the cool aqueous solution and drying the separated ammonium paratungstate.

15. The process of claim 1 wherein the aqueous eluant is an aqueous solution containing from about 0.1 to about 2 weight percent of an eluting agent selected from the group consisting of sodium carbonate, potassium carbonate, and ammonium hydroxide.

16. The process of claim 3 wherein the step of extracting the extractable species of the tungsten values from the acidified aqueous eluate to substantially concentrate the tungsten values is accomplished by passing the acidified aqueous eluate through a first solvent extraction system, the first solvent extraction system comprising, in sequence:
    a three stage organic solvent extracting circuit, the three organic solvent stages being connected in series such that the acidified eluate is countercurrently directed through each of the stages;
    a two stage wash circuit for washing the organic solvent, the two wash stages being connected in series, the two wash stages of the wash circuit removing residual acid from the organic solvent;
    a two stage aqueous stripping circuit, the two stripping stages being connected in series, the aqueous stripping circuit containing an ammoniate aqueous strip solution having from about 1 to about 5 weight percent ammonia, the aqueous strip solution stripping the tungsten values from the organic solvent phase and providing an aqueous phase containing concentrated tungsten values and an organic solvent phase; and
    separating the organic solvent phase from the aqueous phase.

17. The process of claim 16 wherein the separated organic solvent phase from the strip circuit is recycled to the three stage organic solvent extracting circuit, to provide an internal recycle of organic solvent to water in the ratio of about 1:1, and wherein the process further comprises:

passing the separated organic solvent phase through a two stage aqueous wash circuit to substantially remove ammonia from the organic solvent phase prior to recycle of the organic solvent phase, the two stage aqueous wash circuit being connected in series.

18. The process of claim 17 wherein the three stage organic solvent extracting circuit is loaded with the aqueous acidified eluate to provide a ratio of organic solvent to water in the solvent extraction circuit of about 1:57, and wherein the organic solvent is stripped with the ammoniated water to provide a ratio of organic solvent to water in the stripping circuit of about 1:6.

19. The process of claim 18 wherein the three stage organic solvent extracting circuit is maintained at a temperature of from about 30° C. to 60° C., the pH of the acidified eluate is maintained at a pH of from about 1 to about 2 within the three stage organic solvent extracting circuit, and the temperature of the stripping circuit is maintained at a temperature of from about 40° C. to about 50° C.

20. The process of claim 16 wherein the aqueous phase containing the concentrated tungsten values is subjected to a second solvent extraction system comprising, in sequence:

passing the aqueous phase from the first solvent extraction system through a three stage organic solvent extracting circuit, the three organic solvent stages being connected in series such that the aqueous phase is counter-currently directed through each of the stages;

a two stage wash circuit for washing the organic solvent, the two wash stages being connected n series, the two wash stages of the wash circuit removing residual acid from the organic solvent;

a two stage aqueous stripping circuit, the two stripping stages being connected in series, the aqueous stripping circuit containing an ammoniate aqueous strip solution having from about 1 to 2 weight percent ammonia, the aqueous strip solution stripping the tungsten values from the organic solvent phase and providing an aqueous phase containing concentrated tungsten values and an organic solvent phase; and separating the organic solvent phase from the aqueous phase.

21. The method of claim 20 wherein the separated organic solvent phase from the strip circuit is recycled to at least one of the three stage organic solvent extracting circuit of the first and second solvent extraction systems, and wherein the process further comprises:

passing the separated organic solvent phase through a two stage aqueous wash circuit to substantially remove ammonia from the organic solvent phase prior to recycle of the organic solvent phase, the two stage aqueous wash circuit being connected in series.

22. The method of claim 21 wherein the three stage organic solvent extracting circuit is loaded with the aqueous phase recovered from the first extraction system to provide a ratio of organic solvent to water in the solvent extraction circuit of the second extraction system of about 1:1; and wherein the organic solvent is stripped with the ammoniated water to provide a ratio of organic solvent to water in the stripping circuit of the second extraction system of about 1:1.

* * * * *